United States Patent
Persson et al.

(10) Patent No.: US 9,026,354 B1
(45) Date of Patent: May 5, 2015

(54) DETERMINING OPTIMAL MAP DOWNLOADING LOCATIONS

(75) Inventors: Carl Persson, Olathe, KS (US); M. Jeffrey Stone, Overland Park, KS (US); Woojae Lee, Manhattan, KS (US); Cesar Perez, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1023 days.

(21) Appl. No.: 12/749,639

(22) Filed: Mar. 30, 2010

(51) Int. Cl.
*G05D 1/00* (2006.01)
*G05D 1/10* (2006.01)
*G01C 21/26* (2006.01)
*G01C 21/32* (2006.01)

(52) U.S. Cl.
CPC ............... *G01C 21/26* (2013.01); *G01C 21/32* (2013.01)

(58) Field of Classification Search
None
See application file for complete search history.

(56) References Cited

U.S. PATENT DOCUMENTS 7,610,149 B2 * 10/2009 Karaoguz et al. ............. 701/440
2009/0204600 A1 * 8/2009 Kalik et al. ...................... 707/5

* cited by examiner

*Primary Examiner* — Ryan Zeender
*Assistant Examiner* — Denisse Ortiz Roman

(57) ABSTRACT

Methods and computer-readable media are provided to determine optimal locations at which it is suggested that a mobile device download portions of a map corresponding to an initial location and a destination location. A navigation server receives an indication of an initial location and a destination location from the mobile device and retrieves a map corresponding to a route between the two locations. A first download location is determined based on one or more of signal strength, a time of day that the map is likely to be downloaded, periods of known high saturation, a battery level of the mobile device, and/or a cost associated with roaming. Using one or more of these factors, the first download location is determined and is communicated to the mobile device.

20 Claims, 5 Drawing Sheets

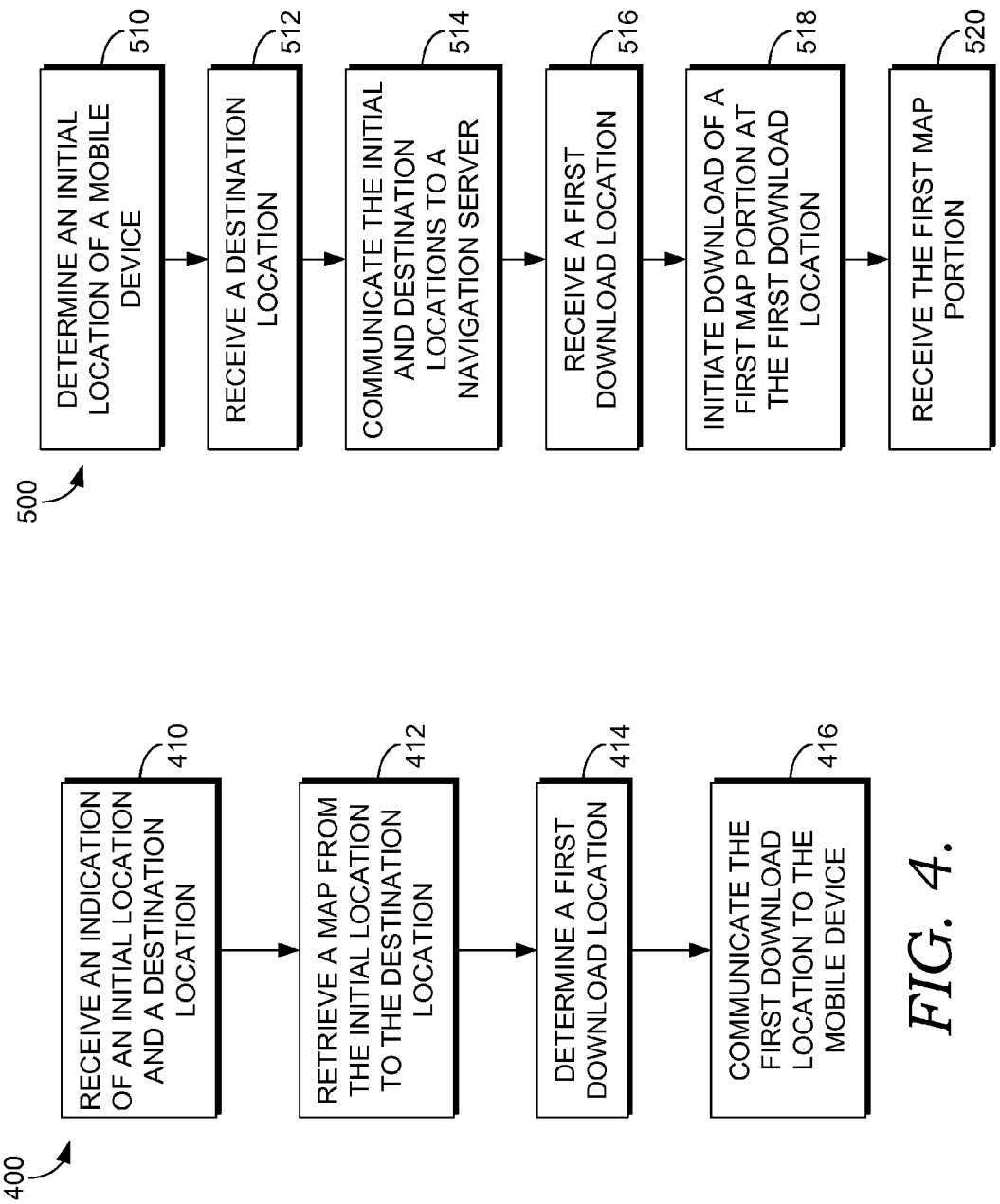

DETERMINING OPTIMAL MAP DOWNLOADING LOCATIONS

SUMMARY

Embodiments of the invention are defined by the claims below, not this summary. A high-level overview of various aspects of the invention are provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter.

In brief and at a high level, this disclosure describes, among other things, methods, systems, and computer-readable media for determining optimal locations at which it is suggested that a mobile device download portions of a map. The map corresponds to a route from an initial location to a destination location. The initial location may be known based on user input, or may be determined by way of a global positioning system (GPS) or cell tower triangulation. A navigation server, in one embodiment, determines the optimal download locations based on a number of factors. These factors include, for instance, signal strength, a time of day at which the mobile device is expected to download the portion of the map, periods of known high saturation and high-traffic areas, a battery level of the mobile device, and costs associated with various roaming providers. In another embodiment, the mobile device is provided with this information and makes the determination as to the most efficient locations along the route at which it will download portions of the map. Downloading only portions of the map at one time allows for a smaller storage capacity of the mobile device. A data connection may only be required at the download locations, thus conserving battery power of the mobile device. While aspects of the present invention describe downloading portions of a map corresponding to an initial location and destination location at a time, it is contemplated to be within the scope of the present invention that an entire map for the route from the initial location to the destination location may be downloaded at one time such that a data connection may not be needed once the map is downloaded.

BRIEF DESCRIPTION OF THE SEVERAL VIEWS OF THE DRAWINGS

Illustrative embodiments of the present invention are described in detail below with reference to the attached drawing figures, wherein:

FIGS. 4-6 depict flowcharts of methods for determining optimal locations for downloading portions of a map, in accordance with various embodiments of the present invention.

DETAILED DESCRIPTION

The subject matter of the present invention is described with specificity herein to meet statutory requirements. However, the description itself is not intended to define the invention, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

AAA Authentication, Authorization, and Accounting
BTS Base Transceiver Station
CDMA Code Division Multiple Access
CSCF Call Session Control Function
GPS Global Positioning System
GSM Global System for Mobile communications (Groupe Spécial Mobile)
HTTP Hypertext Transfer Protocol
LED Light Emitting Diode
MIP Mobile Internet Protocol
PDA Personal Data Assistant
TDMA Time Division Multiple Access
UMTS Universal Mobile Telecommunications System Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
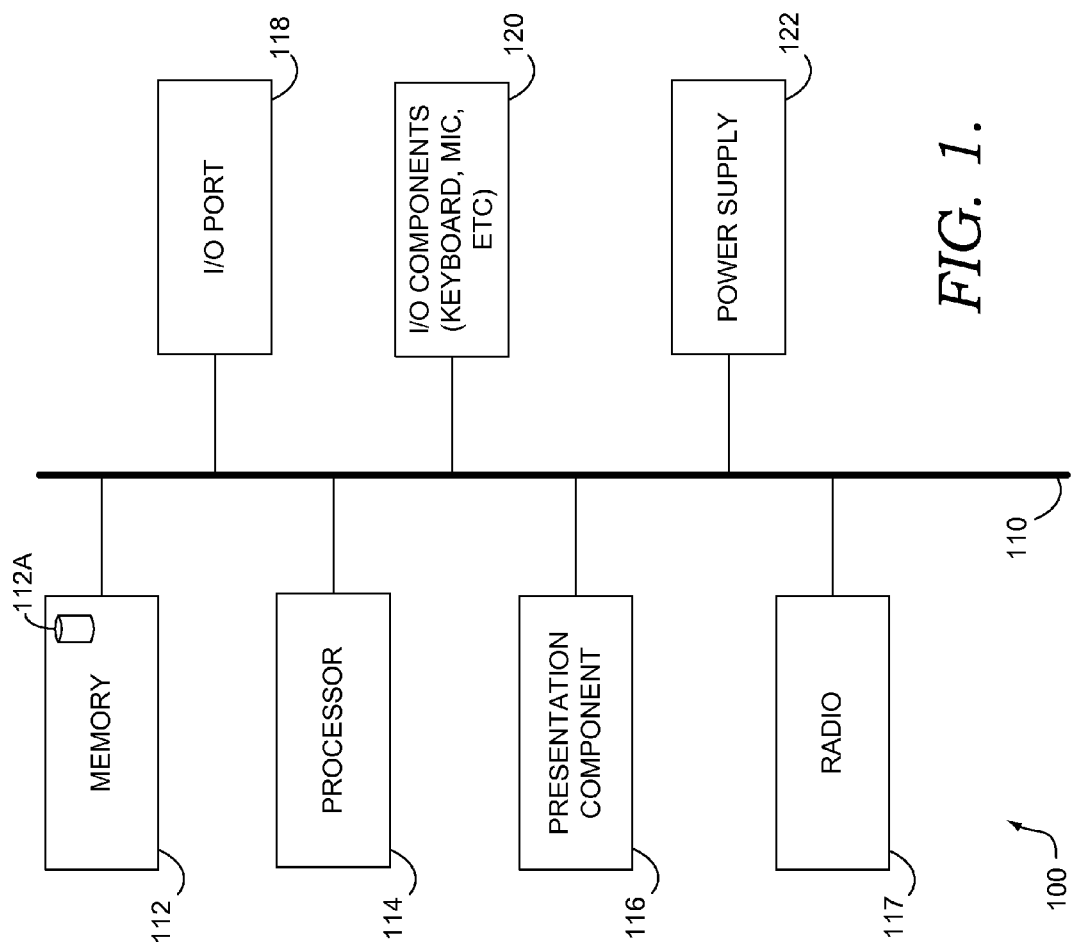
FIG. 1 depicts an illustrative device suitable for use in connection with an embodiment of the present invention.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. A mobile device may be one of many devices, including, but not limited to, a mobile phone, a laptop, a PDA, a handheld device, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

We previously have described various memory components that memory 112 might take the form of. Thus, we will not elaborate more here, only to say that memory component 112 can include any type of medium that is capable of storing information (e.g., a datastore 112A). Processor 114 might actually be multiple processors that receive instructions and process them accordingly. Presentation component 116 includes the likes of a display, a speaker, as well as other components that can present information (such as a lamp (LED), or even lighted keyboards).

Radio 117 is a radio that facilitates communication with a wireless telecommunications network. Illustrative wireless telecommunications technologies include CDMA, GPRS, TDMA, GSM, WIMAX, LTE, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

Figure 2:
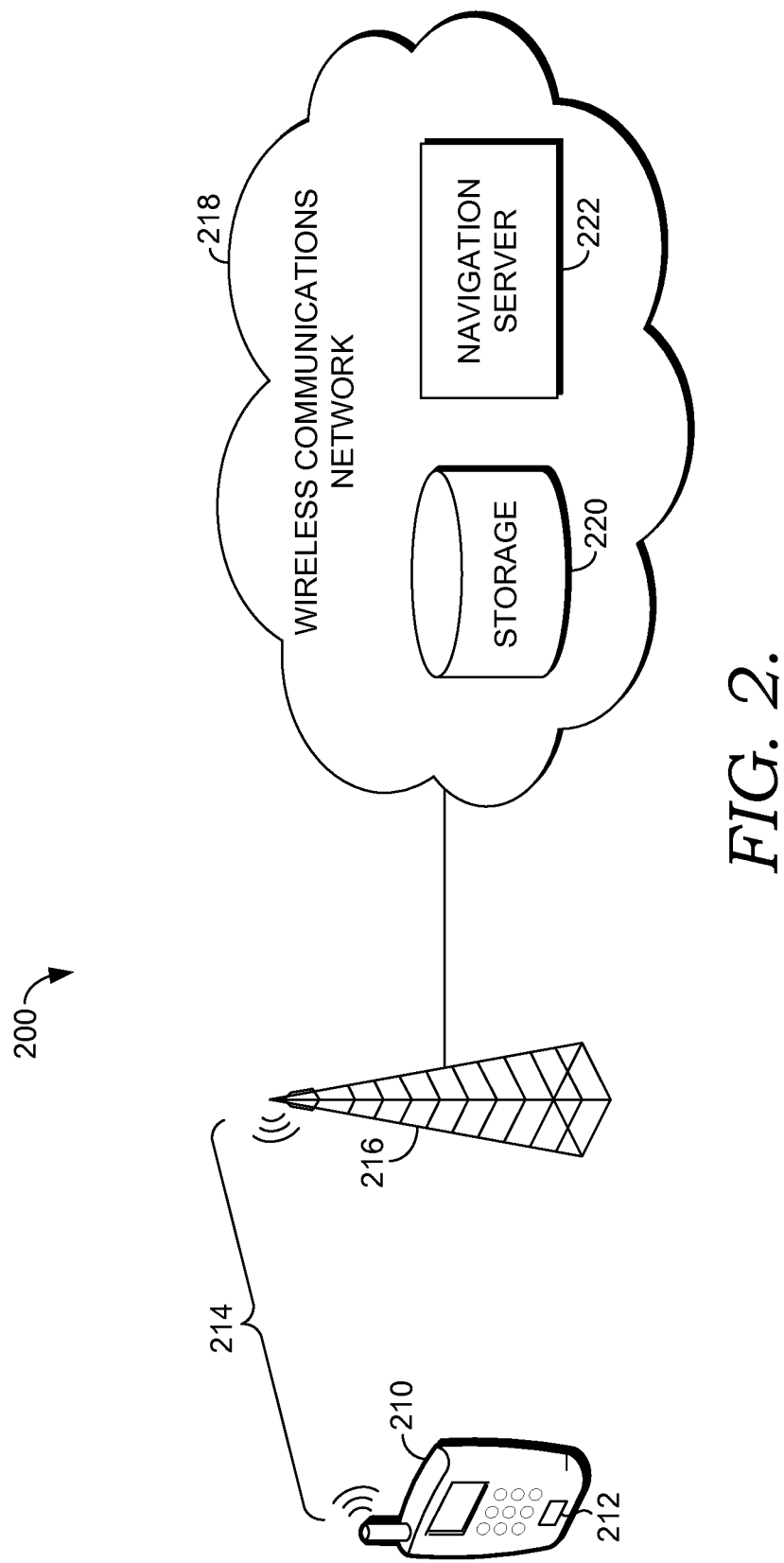
FIG. 2 depicts an illustrative operating environment suitable for practicing an embodiment of the present invention.

Turning now to FIG. 2, an illustrative operating environment is provided and referenced generally by the numeral 200, which depicts an illustrative networking environment that enables a determination of the most efficient time for a mobile device to download a portion of a map that corresponds to an initial location and a destination location. Mobile device 210 is the type of device described in connection with FIG. 1 in one embodiment. It includes a client application 212 that helps carry out aspects of the technology described herein. Whenever we speak of an application, software, or the like, we are really referring to one or more computer-readable media that are embodied with a set of computer-executable instructions that facilitate various actions to be performed. We will not always include this lengthy terminology because doing so would make this document more difficult to read. In one embodiment, the client application 212 communicates location information to a wireless communications network 218, and receives maps or portions of a map that are used to provide directions to a user of the mobile device 210.

Mobile device 210 communicates with a base transceiver station (BTS) 216 by way of a communications link 214. BTS 216 provides access to what some skilled artisans refer to as a wireless communications network, also termed a core network. We do not mean to imply that the item referred to in FIG. 2 by reference numeral 218 is the only form of a wireless communications network that is possible. To the contrary, not all components that make up wireless communications network 218 are shown, and some of the components that are shown as being within wireless communications network 218 do not need to be. Also, not all connections or possible connections are shown (such as, for example, between navigation server 222 and storage 220).

The wireless communications network 218 includes various components, some of which are not shown. A navigation server 222 and a storage 220 are illustrated in FIG. 2. In one embodiment, the navigation server 222 is connected to the storage 220 so that information stored in the storage 220, such as maps and directional information, can be accessed and retrieved by the navigation server 222. The navigation server 222 serves many purposes. Generally, the navigation server 222 receives location information, such as an initial and a destination location from the mobile device 210 or the application 212 within the mobile device 210. The navigation server 222, using that information, determines a map or a portion of a map that should be sent to the mobile device 210. Additionally, the navigation server 222, using the map that it retrieves from the storage 220, for example, determines the best points or locations on the map for the mobile device 210 to download portions of a map. As such, in one embodiment, the mobile device 210 is instructed by, for example the navigation server 222, various locations at which it is most efficient for the mobile device 210 to download portions of a map. To make this determination, various factors are taken into consideration to locate the most efficient spots on a map. These factors include, but are not limited to, areas of noncoverage or poor coverage, signal strength, periods of known high saturation, battery level of the mobile device 210, and roaming areas. These factors will be described in detail below.

In one embodiment, the navigation server 222, once it receives location information from the mobile device 210 (e.g., via the application 212), accesses a database, such as the storage 220, to retrieve a map corresponding to the route from the initial location to the destination location. In one instance, an optimal route is determined by the navigation server 222, or preferences from the user of the mobile device 210 may be communicated to the navigation server 222 so that the navigation server 222 can determine a route based on those preferences, such as a particular highway on which the user would like to travel to arrive at the destination location. Once the navigation server 222 has the map, it may then retrieve one or more that illustrate coverage area, roaming locations, signal strength at various locations, etc., and overlay these maps onto the map of the optimal route. In another embodiment, maps are not overlaid, but various locations (e.g., identified by GPS locations or intersections) are compared to determine the best points at which portions of a map should be downloaded by the mobile device 210. Once these points are determined, they are communicated to the mobile device 210. For instance, a particular location along a route from an initial location to a destination location may be identified as being an efficient spot for the mobile device 210 to download the next portion of the map, such as from that spot to the next spot identified as being an efficient location. This particular spot may be efficient in that signal strength is known to be strong, and while the mobile device 210 will be roaming, it may be roaming in another network that has a lower roaming rate than other networks.

Alternatively, the particular spot may be considered to be an efficient location to download a portion of a map if the battery level of the mobile device 210 is not expected to be low at that spot, and traffic in that area is not expected to be significant in that significant amounts of traffic likely saturate nearby cell towers. These are just examples, but it is contemplated that other combinations of factors, as well as other factors not mentioned herein, may be used to determine the best locations at which the mobile device 210 should download portions of a map. As used herein, portions of a map may refer to an entire map covering a route from the initial location to the destination location, or may cover just a portion of that route. In not downloading the entire map at the beginning of the route, the mobile device 210 is not required to use such a large amount of its internal storage to download the entire map. Further, while one data store (storage 220) is illustrated in FIG. 2, it is contemplated to be within the scope of the present invention that more than one data store may be used to accomplish embodiments of the present invention described herein.

As mentioned, some components are not depicted on FIG. 2 so as to not obscure aspects of the various embodiments of the present invention. For instance, the wireless communications network 218 may include various components that are not shown. One of these components is a network-access gateway (not shown) that helps facilitate communication between mobile device 210 and other networks (not shown) as well as the Internet. The network-access gateway is also known by some skilled artisans as a packet data serving node (PDSN). Similarly, others might refer to this device as a foreign agent. The network-access gateway helps manage communications sessions between the mobile device 210 and other components, such as components of the wireless communications network 218 (such as those not shown). Any device that provides similar functionality is contemplated within the scope of this disclosure. For example, a GSM offers similar functionality in networks that utilize GSM or UMTS technology. At a high level, the network-access gateway helps provide access to the Internet as well as to other network technologies and application services. It helps provide mobile IP (MIP) access, one-agent support, and transportation of packets to facilitate the funneling or communicating of data through virtual private networks. It can act as a client for an authentication server (not shown), which helps ensure that mobile device 210 is authorized to communicate via the wireless telecommunications network. In some embodiments, the authentication server is known as an authentication, authorization, and accounting (AAA) server. But it can be any device that helps authenticate mobile device 210. In one embodiment, a network-access gateway includes a set of computer executable instructions that helps carry out various aspects of technology described herein.

Another component not depicted in FIG. 2 may include a radio network controller that often sits between BTS 216 and the network-access gateway, although its functionality can be subsumed into other elements. We have included a selection of components so as to not obscure more relevant aspects of the technology that we are describing. Further, a home agent (not shown) may be included in the embodiment of FIG. 2. A home agent is a router on the mobile device's 210 home network that maintains information about the device's current location, which, in one embodiment, is identified in a care-of-address. This allows the mobile device 210 to keep the same IP address even when it connects from a different location. In one instance, the home agent works in conjunction with a foreign agent.

Generally, in this disclosure, when we speak of communicating data or information we are referring to any action that requires mobile device 210 to have an IP address in order to carry out some action. Mobile device 210 might attempt to access items such as the Internet as well as other components that might alone or in combination facilitate things such as television reception, e-mail reception, picture mail, video mail, video conferencing, and the like.

Figure 3:
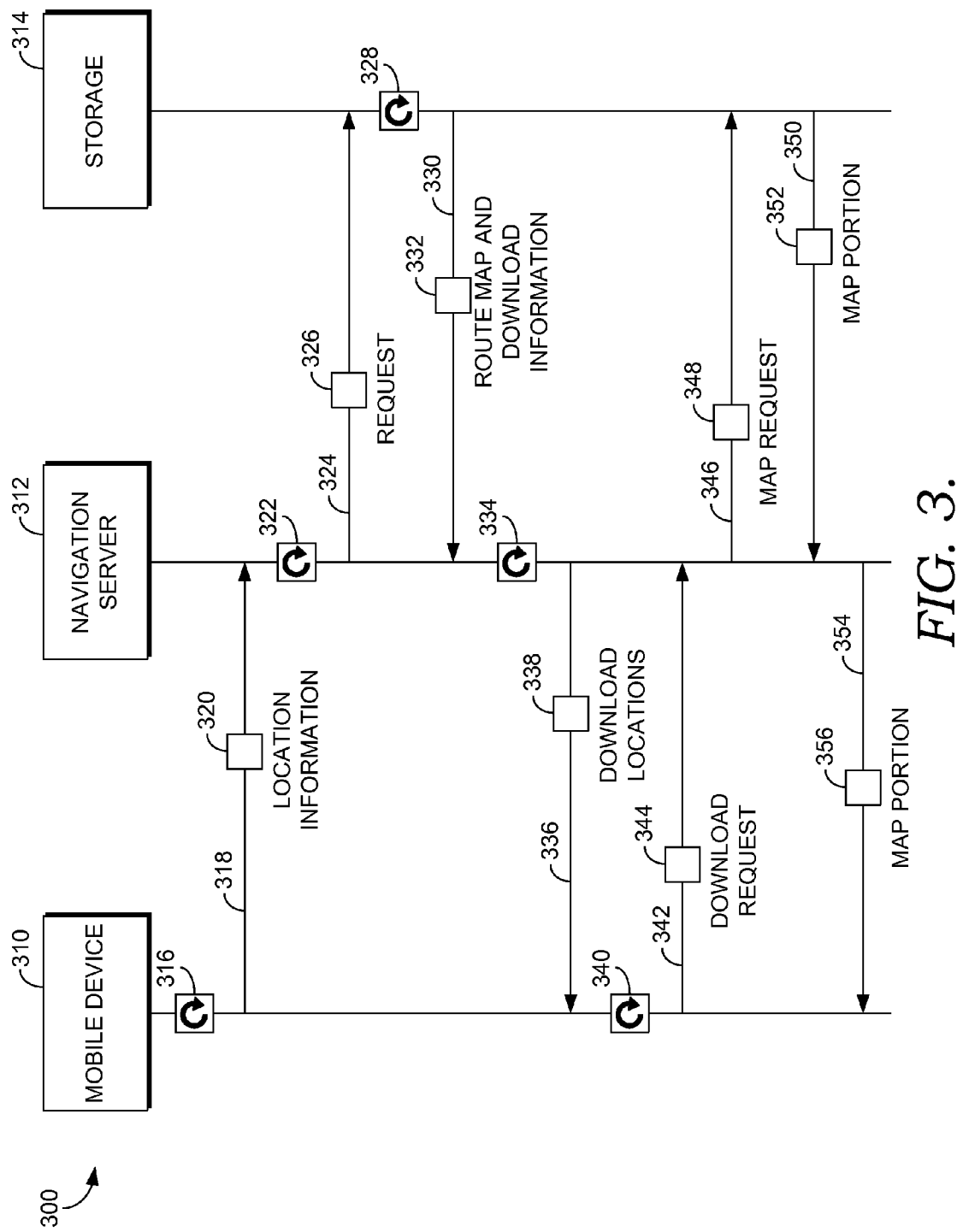
FIG. 3 depicts a flow diagram illustrating a method for determining optimal locations for downloading portions of a map, in accordance with an embodiment of the present invention.

Referring now to FIG. 3, a flow diagram is illustrated of a method 300 for determining optimal locations for downloading portions of a map, in accordance with an embodiment of the present invention. Initially, a mobile device 310, a navigation server 312, and a storage 314 are illustrated in FIG. 3. While these three components are illustrated, other components not shown may also be used to carry out aspects of the present invention. These three components are illustrated for exemplary purposes only and are not intended to limit the scope of aspects of the present invention in any way. The mobile device 310, such as the mobile device described in relation to FIGS. 1 and 2 herein, receives user input at step 316. The user input comprises location information, such as an initial location and a destination location. In one embodiment, the initial location is determined by GPS coordinates or another system that provides for a location of a mobile device. As such, in this embodiment, the user does not input the initial location, but this information may be received from a source outside of the mobile device 310. The mobile device 310 communicates 318 location information 320 to the navigation server 312. The location information may include an initial location and a destination location. In addition to the location information, the mobile device 310 may also communicate battery level information associated with the mobile device 310. Battery level may be used by the navigation server 312 as one of several factors for determining the best locations to download portions of a map.

The navigation server 312, based on the location information, determines an optimal route at step 322 for which a map is to be provided to the mobile device 310. In one embodiment, the optimal route is the route having the least distance between the initial and destination location. In another embodiment, the optimal route is the route that is calculated to take the least driving time, and may not necessarily be the least distance between the initial and destination location. In yet other embodiments, the optimal route may take into consideration one or more user preferences, such as whether the user wishes to travel on a highway, whether the user wishes to avoid a certain area, whether the user wishes to take a scenic route, etc. These user preferences, in one embodiment, are communicated to the navigation server 312 along with the location information.

Once a route is determined, the navigation server 312 communicates 324 a map request 326 to the storage 314. In one embodiment, the storage contains a database of maps of the United States and may even contain maps of other countries as well. Along with a request for a map or at least a portion of a map corresponding to the determined route, the navigation server 312 may also request certain other information that is used to determine download locations for the mobile device 310. This information includes various factors that either alone or in combination are used by the navigation server 312 to determine the most efficient locations at which the mobile device is instructed to download portions of a map. For exemplary purposes only and not limitation, these factors include a coverage map for a service provider associated with the mobile device 310, the type of wireless service provided to that service provider (e.g., 1G, 3G, 4G, WiFi), signal strength along the determined route, periods of known high saturation along the route (e.g., known from traffic information), battery level of the mobile device 310, roaming information, such as costs associated with roaming networks along the route (e.g., preferred roaming lists), etc. These factors are explained in more detail below.

At step 328, the storage 314 determines which maps to communicate to the navigation server 312 and may even determine which types of download information (such as information associated with the factors listed above) to send as well. The storage 314 communicates 330 the route map corresponding to the determined route from the initial location to the destination location and the download information, collectively 332. At step 334, the navigation server 312 determines the optimal download locations at which the mobile device is to download maps or portions of a map corresponding to the initial location to the destination location.

In some embodiments, download locations are determined in real-time, such as after the location information is communicated to the navigation server 312 and once the navigation server 312 has retrieved a route map of the route between the initial location and destination location and other information used to determine the download locations. In these embodiments, coverage maps, maps showing signal strength, maps of roaming providers in different areas, maps showing high saturated areas at different times of the day, etc., may be overlaid over the route map to determine the best download locations on-the-fly. In other embodiment, however, the best download locations are predetermined, and as such, a map may still be overlaid onto the route map, but this overlaid map may illustrate the most desirable locations at which the mobile device should download portions of a map, instead of coverage information, signal strength information, saturation information, or the like.

As mentioned above, a coverage map may be used to determine areas of non-coverage or poor coverage. A coverage map may be overlaid onto a route map of the area from the initial location to the destination location to determine those areas with the best coverage of the service provider that provides wireless communications services to the mobile device. In one embodiment, preset points are indicated on the coverage map to illustrate those areas that are known to have better coverage than others. This avoids areas where downloading maps is less efficient, as well as those areas where expensive roaming costs are incurred when another network is utilized in areas of noncoverage of the mobile device's affiliated network. Also as mentioned above, the determination of the best and worst coverage areas can be determined in real-time, or can be predetermined prior to the time when the navigation server 312 receives the location information from the mobile device 310.

Signal strength at various locations along the determined route may also be taken into consideration when determining the optimal download locations. Areas of poor and strong signal strength may be predetermined, or may be determined in real-time. For instance, in one embodiment, the signal strength associated with the mobile device 310 may be high, but may be decreasing. The navigation server 312, if provided with the signal strength information, or the mobile device 310 itself may make the determination that the next portion of the map should be downloaded, as signal strength is weakening. This may occur if the signal strength indication on the mobile device 310 has decreased from four bars, to three bars, to two bars, etc. This avoids the need to download a portion of a map when signal strength is low (e.g., slow download times) or perhaps when the mobile device 310 is not receiving any signal at all. Two considerations are taken into account when determining an optimal download location based on signal strength. Those include download speed at various signal strengths and a vicinity of the mobile device 310 to the cell phone tower.

Another factor that may be used to determine optimal download locations is periods of known high saturation in certain areas. This factor may take into consideration the time of day at which the mobile device would be downloading a portion of the map. It may also take into consideration traffic information at that time of day and in that particular area. For instance, a particular intersection that is heavily trafficked at 5:00 PM on a Friday may have a high saturation of mobile device users at that time, which correlates to the cell towers in that area also being saturated with traffic. High saturation translates to slower download times.

Yet another factor that may be used to determine optimal download locations is the battery level of the mobile device 310. When the battery level of the mobile device 310 is getting low, portions of the map may be predownloaded so that the data connection can be turned off for the remainder of the route to the destination location to conserve power. Cell tower information, as opposed to GPS, may also be used for route location when good enough. This also assists in conserving power.

Preferred roaming lists may be consulted to determine which network the mobile device 310 would be roaming with at a certain location and fees associated with that roaming provider. A large amount of fees are incurred when a mobile device is roaming with another network, such as a foreign network. To reduce these fees for the home network, and ultimately to users of mobile devices, it is most efficient for maps to be downloaded either where roaming is not necessary, or at least where roaming charges are minimized. As roaming rates for various foreign networks are likely known in advance, roaming areas of lower costs or areas where roaming is not necessary can either be predetermined or determined in real-time.

Returning to FIG. 3, the download locations 338 determined by the navigation server 312 are communicated 336 to the mobile device 310. In one instance, all determined download locations are communicated to the mobile device, but in another instance, one download location at a time is communicated to the mobile device. Once the mobile device 310 knows where and when it is best to download portions of the map, it can determine, at step 340, that a first download location has been reached. Upon reaching the first download location, the mobile device 310 communicates 342 a download request 344 to the navigation server 312 indicating that it wishes to download at least a first portion of the map. Although this is referred to as the first portion, the portion of the map from the initial location to the first download location may already be downloaded onto the mobile device 310, and this may have occurred prior to the mobile device 310 arriving upon the first download location. In the embodiment illustrated in FIG. 3, the navigation server 312 communicates 346 a map request 348 to the storage 314, and the storage 314 returns 350 the requested map portion 352 to the navigation server. In other embodiments, however, the navigation server 312 already has the entire map from the initial to the destination location, which it may have received at step 330, and therefore may not need to request it again, as shown here. The navigation server 312 communicates 354 the map portion 356 to the mobile device 310 in response to the mobile device's 310 download request 344.

While the embodiment of FIG. 3 describes the navigation server 312 as being responsible for determining the optimal download locations for the mobile device, in other embodiments, the mobile device 310 itself may make these determinations. For instance, based on battery level, the mobile device 310 may determine that a portion of a map should be downloaded at a certain time, and the navigation server may not have been involved in any way in making that determination. Or, signal strength, periods of known high saturation, coverage areas, roaming areas, and other information may be communicated to the mobile device 310 from the navigation server 312 such that the mobile device 310 is able to make such determinations as to the best locations to download portions of a map. In some instances, this determination may be made by the navigation server 312 so as to conserve battery life of the mobile device. But, it is contemplated to be within the scope of the present invention that the mobile device 310 can determine the optimal download locations as well as the navigation server 312.

FIG. 4 depicts a flowchart of a method 400 for determining optimal locations for downloading portions of a map, in accordance with an embodiment of the present invention.

Initially, at step 410, an indication is received of an initial location and a destination location. The initial and destination locations describe geographical locations. In one embodiment, the initial and/or destination locations are a street address. In another embodiment, they are intersections. In yet other embodiments, they are cities or zip codes. In addition to the initial and destination locations, a battery level indication corresponding to the mobile device is received. The initial location may be inputted by the user, or may be determined via GPS, cell tower triangulation, or the like. At step 412, a map is retrieved that corresponds to a route from the initial location to the destination location. In one instance, the route is a suggested route and is based on the shortest distance between the initial location and the destination location. But, in another instance, the suggested route is based on the shortest traveling time between the initial location and the destination location. This may take into account stop lights, traffic conditions, road conditions, etc. In still another instance, the suggested route is based on one or more user preferences. The map may be retrieved from a navigation storage. In one embodiment, the entire map corresponding to a route from the initial location to the destination location is retrieved, but in another embodiment, only a portion of the map is retrieved.

At step 414, a first download location is determined. The first download location is along the suggested route and is a location at which it is suggested that the mobile device download a first map portion. Several factors, as described above, may be taken into account when determining the first download location. These factors include, but are certainly not limited to, signal strength, a time of day at which the mobile device is expected to download the first map portion, periods of known high saturation (e.g., based on traffic within range of a cell tower), a battery level of the mobile device, and a cost associated with roaming. At step 416, the first download location is communicated to the mobile device so that the mobile device can initiate a download of the first map portion upon reaching the first download location. In one embodiment, the mobile device initiates a download of the first map portion prior to reaching the first download location, but in another embodiment, initiates the download upon reaching the first download location. The first map portion, according to one aspect, begins at the first download location and ends at a second download location. According to another aspect, the first map portion begins prior to the first download location. According to yet another aspect, the first map portion begins after the first download location.

In one embodiment, a download request is received from the mobile device at the first download location. The first map portion is retrieved, such as by accessing the navigation storage that stores maps and other pertinent information. The first map portion is then communicated to the mobile device. As previously mentioned, the download locations may be determined in real-time, such as in response to receiving the indication of the initial and destination locations, or may be predetermined, such as prior to receiving the indication of the initial and destination locations.

Turning now to FIG. 5, a flowchart is illustrated of another method 500 for determining optimal locations for downloading portions of a map, in accordance with an embodiment of the present invention. An initial location of a mobile device is determined at step 510. This determination may be made by user input, GPS, cell tower triangulation, etc. At step 512, a destination location is received by way of user input. The user input includes one or more of a street address, an intersection, a city, or a zip code. Any other location identifier is also contemplated to be included in embodiments of the present invention. The initial and destination locations are communicated to a navigation server at step 514. At step 516, a first download location is received. In one embodiment, it is received from the navigation server that is responsible for determining the optimal download locations. The first download location is along a suggested route from the initial location to the destination location. At step 518, upon arriving at the first download location, a download of a first map portion is initiated. The first map portion corresponds to at least a portion of the suggested route from the initial location to the destination location. In one embodiment, the map portion corresponds to the first download location to a second download location. At step 520, the first map portion is received.

In one embodiment, an indication of a second download location is received along the suggested route from the initial location to the destination location. Upon arriving at the second download location, the download of the second map portion is initiated, such that the second map portion corresponds to at least the portion of the suggested route from the initial location to the destination location. The second map portion is then received.

Figure 6:
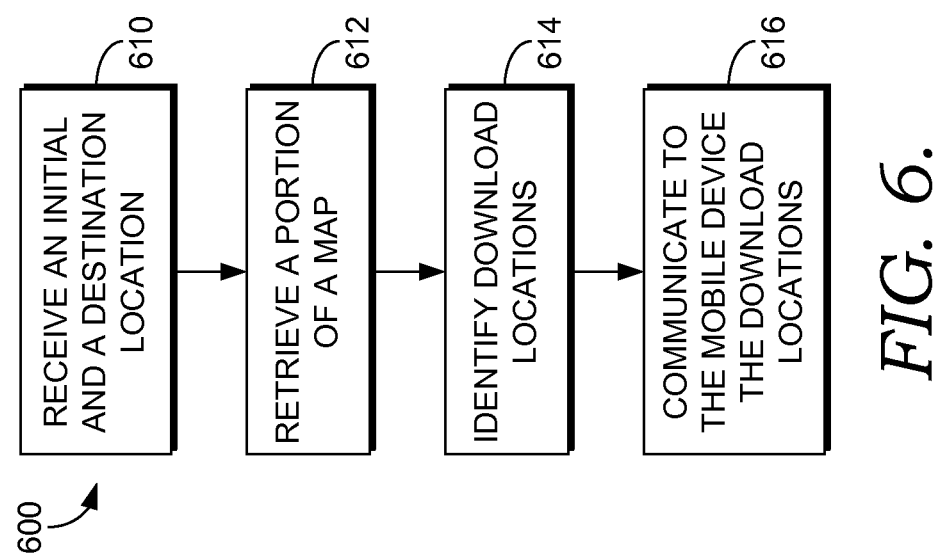

Referring to FIG. 6, a flowchart is shown of another method 600 for determining optimal locations for downloading portions of a map, in accordance with an embodiment of the present invention. Initially, at step 610, an indication is received of an initial location and a destination location from a mobile device. Based on the initial and destination locations, a portion of a map is retrieved at step 612. The portion of the map, or in one embodiment, the entire map illustrating a route from the initial to the destination location, is retrieved from a navigation storage. At step 614, one or more download locations are identified along a route from the initial location to the destination location. The download locations are locations along the route at which it is suggested that the mobile device download various portions of the map.

Identifying the download locations, as shown in step 614, may include retrieving signal strength data and roaming cost data along the suggested route. Further, it may include determining a time of day at which the mobile device is expected to travel along the suggested route. Battery level information may be requested for the mobile device. Additionally, signal strength data, roaming cost data, time of day, and/or battery level information are compared to identify the optimal download locations, such as those locations that would provide the fastest and most cost-efficient downloading of a map. At step 616, the determined download locations are communicated to the mobile device.

In one embodiment, a download request for a first map portion is received at a first download location. The first map portion, while referred to as "first," may not include the portion from the initial location to the first download location, as that may already have been communicated to the mobile device. The first map portion is retrieved, such as from a navigation storage. The first map portion corresponds to a route from the first download location to a second download location. The first map portion is then communicated to the mobile device. Upon reaching a second download location, a similar process takes place for the mobile device to request and receive a second map portion.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media having computer-executable instructions embodied thereon that, when executed, facilitate a method of determining optimal locations for map downloading, the method comprising:
   receiving an indication of an initial location and a destination location, wherein the initial location and the destination location describe geographical locations;
   accessing a navigation storage to retrieve a map corresponding to a suggested route from the initial location to the destination location;
   identifying a plurality of download locations along the suggested route on the map that are most efficient for map downloading; and
   based on download efficiencies of the plurality of download locations, identifying a first download location from the plurality of download locations along the suggested route on the map at which it is suggested that the mobile device download a first map portion, wherein the download efficiencies of the plurality of download locations are determined based on one or more of,
   (1) signal strength,
   (2) a time of day at which the mobile device is expected to download the first map portion,
   (3) periods of known high saturation,
   (4) a battery level of the mobile device, or
   (5) a cost associated with roaming; and
   communicating the first download location to the mobile device.

2. The computer-readable media of claim 1, further comprising receiving a battery level indication corresponding to the mobile device.

3. The computer-readable media of claim 1, wherein the suggested route is a shortest distance between the initial location and the destination location.

4. The computer-readable media of claim 1, wherein the suggested route is a shortest traveling time between the initial location and the destination location.

5. The computer-readable media of claim 1, wherein the suggested route is determined based on user preferences.

6. The computer-readable media of claim 1, wherein the periods of known high saturation is based on traffic within range of a cell tower.

7. The computer-readable media of claim 1, wherein the first map portion begins at the first download location and ends at a second download location.

8. The computer-readable media of claim 1, wherein the first map portion begins prior to the first download location.

9. The computer-readable media of claim 1, wherein the first map portion begins after the first download location.

10. The computer-readable media of claim 1, further comprising:
   receiving a download request from the mobile device at the first download location;
   retrieving the first map portion; and
   communicating the first map portion to the mobile device.

11. The computer-readable media of claim 1, wherein the first download location is determined in response to receiving the indication of the initial location and the destination location.

12. The computer-readable media of claim 1, wherein the first download location is determined prior to receiving the indication of the initial location and the destination location.

13. The computer-readable media of claim 1, wherein the initial location is determined by a global positioning system (GPS).

14. Non-transitory computer-readable media having computer-executable instructions embodied thereon that, when executed, facilitate a method of determining optimal locations for map downloading, the method comprising:
   determining an initial location of a mobile device;
   receiving user input of a destination location;
   communicating the initial location and the destination location to a navigation server;
   receiving an indication of a first download location along a suggested route from the initial location to the destination location, wherein the first download location is a location at which it is suggested that at least one portion of a map be downloaded, and wherein the first download location is selected from a plurality of download locations along the suggested route based on an efficiency of downloading the at least one portion of the map at the first download location;
   upon arriving at the first download location, initiating a download of a first map portion corresponding to at least a portion of the suggested route from the initial location to the destination location; and
   receiving the first map portion.

15. The computer-readable media of claim 14, wherein a current location of the mobile device along the suggested route is determined by way of cell tower triangulation.

16. The computer-readable media of claim 14, wherein a current location of the mobile device along the suggested route is determined by way of a global positioning system (GPS).

17. The computer-readable media of claim 14, wherein the user input includes one or more of a street address, an intersection, a city, or a zip code.

18. The computer-readable media of claim 14, further comprising:
   receiving an indication of a second download location along the suggested route from the initial location to the destination location;
   upon arriving at the second download location, initiating the download of a second map portion corresponding to at least the portion of the suggested route from the initial location to the destination location; and
   receiving the second map portion.

19. Computer-readable media having computer-executable instructions embodied thereon that, when executed, facilitate a method of determining optimal locations for map downloading, the method comprising:
   receiving an indication of an initial location and a destination location from a mobile device;
   based on the initial location and the destination location, retrieving at least a portion of a map from a navigation storage that corresponds to a suggested route from the initial location to the destination location;
   identifying one or more download locations from the initial location to the destination location at which it is suggested that the mobile device download various portions of the map, wherein the one or more download locations are identified based on an efficiency of downloading various portions of the map at the one or more download locations, and wherein the identifying includes,
   a) retrieving signal strength data and roaming cost data along the suggested route,
   b) determining a time of day at which the mobile device is expected to travel along the suggested route, c) requesting battery level information for the mobile device, and d) comparing one or more of the signal strength data, the roaming cost data, the time of day, or the battery level information to identify the one or more download locations; and communicating to the mobile device the one or more download locations.

20. The Non-transitory computer-readable media of claim 19, further comprising:

receiving, at a first download location, a download request for a first map portion;

retrieving the first map portion, wherein the first map portion corresponds to a route from the first download location to a second download location; and communicating to the mobile device the first map portion.

* * * * *